(12) United States Patent
Rizzio

(10) Patent No.: US 10,641,398 B2
(45) Date of Patent: May 5, 2020

(54) BALL VALVE WITH INTEGRATED FITTING

(71) Applicant: RED-WHITE VALVE CORP., Lake Forest, CA (US)

(72) Inventor: Giovanni Rizzio, Irvine, CA (US)

(73) Assignee: RED-WHITE VALVE CORP., Lake Forest, CA (US)

( * ) Notice: Subject to any disclaimer, the term of this patent is extended or adjusted under 35 U.S.C. 154(b) by 0 days.

(21) Appl. No.: 15/594,479

(22) Filed: May 12, 2017

(65) Prior Publication Data
US 2017/0328480 A1 Nov. 16, 2017

Related U.S. Application Data

(60) Provisional application No. 62/336,484, filed on May 13, 2016.

(51) Int. Cl.
*F16K 5/06* (2006.01)
*F16K 27/06* (2006.01)

(52) U.S. Cl.
CPC .......... *F16K 5/0605* (2013.01); *F16K 5/0657* (2013.01); *F16K 27/067* (2013.01)

(58) Field of Classification Search
CPC ........ F16K 5/06; F16K 5/0605; F16K 5/0657; F16K 27/067
See application file for complete search history.

(56) References Cited

U.S. PATENT DOCUMENTS

| 2,440,144 | A |   | 4/1948  | Hosking         |                |
|-----------|---|---|---------|-----------------|----------------|
| 3,146,792 | A |   | 9/1964  | Donnelly et al. |                |
| 3,271,845 | A | * | 9/1966  | Breher          | B29C 45/14754  |
|           |   |   |         |                 | 137/15.22      |
| 3,712,584 | A |   | 1/1973  | Wise et al.     |                |
| 3,854,497 | A |   | 12/1974 | Rosenberg       |                |
| 3,907,959 | A |   | 9/1975  | Wise et al.     |                |
| 4,180,542 | A | * | 12/1979 | Wrasman         | B29C 45/14754  |
|           |   |   |         |                 | 264/242        |

(Continued)

FOREIGN PATENT DOCUMENTS

| CN | 202176746    | 3/2016  |
|----|--------------|---------|
| EP | 0457342 A2   | 11/1991 |

(Continued)

OTHER PUBLICATIONS

Data Sheet, How to Install PEX tubing. PEX Tubing Installation. Making a Crimp Connection, http://www.pexuniverse.com/content/how-install-pex-tubind-installation, 6 pages.

(Continued)

*Primary Examiner* — Reinaldo Sanchez-Medina
*Assistant Examiner* — David Colon-Morales
(74) *Attorney, Agent, or Firm* — Lewis Roca Rothgerber Christie LLP

(57) ABSTRACT

Embodiments provide a fitting that is integrated into the valve body of a ball valve during the manufacture of the valve body. The fitting and a cartridge may be overmolded to create the valve body. The mold may apply a pressure onto the fitting during the molding process. The fitting may transfer the pressure of the mold onto the cartridge. The fitting may transfer a sufficient amount of force to seal valve seats of the ball valve.

11 Claims, 8 Drawing Sheets

(56) References Cited

U.S. PATENT DOCUMENTS

| | | | |
|---|---|---|---|
| 4,430,285 A | 2/1984 | Runyan et al. | |
| 4,476,891 A * | 10/1984 | Mulas | F16K 27/067 |
| | | | 137/270 |
| 4,488,573 A | 12/1984 | Runyan et al. | |
| 4,553,562 A * | 11/1985 | Nakada | B29C 45/14 |
| | | | 137/375 |
| 4,883,253 A * | 11/1989 | Hashimoto | F16K 5/0668 |
| | | | 251/315.01 |
| 4,932,436 A | 6/1990 | Kanemaru | |
| 5,305,790 A | 4/1994 | Giacomini | |
| 5,366,257 A | 11/1994 | McPherson et al. | |
| 5,373,868 A | 12/1994 | Rodriguez | |
| 5,586,579 A | 12/1996 | Diehl | |
| 5,895,695 A | 4/1999 | Rowley | |
| 6,098,659 A | 8/2000 | Mannis | |
| 6,260,820 B1 | 7/2001 | Chowdhury | |
| 6,287,501 B1 | 9/2001 | Rowley | |
| 6,539,976 B1 | 4/2003 | Whiteside | |
| 6,814,101 B2 | 11/2004 | Flauzac | |
| 7,051,763 B2 * | 5/2006 | Heren | F16K 27/067 |
| | | | 137/883 |
| 8,220,126 B1 * | 7/2012 | Yunk | B29C 45/14598 |
| | | | 264/236 |
| 8,231,101 B2 | 7/2012 | Hagihara | |
| 8,360,092 B2 | 1/2013 | Tappe | |
| 8,739,826 B2 | 6/2014 | Thomas et al. | |
| 8,840,148 B2 | 9/2014 | Defilippi | |
| 8,844,111 B1 | 9/2014 | Yunk, Jr. et al. | |
| 8,881,586 B2 | 11/2014 | Rothstein et al. | |
| 9,169,953 B2 | 10/2015 | Cavagna | |
| 9,187,883 B2 | 11/2015 | Armbruster et al. | |
| 10,036,481 B2 * | 7/2018 | Reck | F16K 27/067 |
| 2009/0032761 A1 | 2/2009 | Tsai | |
| 2009/0306598 A1 | 12/2009 | Arcaro et al. | |
| 2011/0017932 A1 | 1/2011 | Domingues Matos | |
| 2015/0308576 A1 | 10/2015 | Yelkin et al. | |
| 2016/0084398 A1 | 3/2016 | Reck | |

FOREIGN PATENT DOCUMENTS

| | | |
|---|---|---|
| EP | 205601 A2 | 5/2009 |
| EP | 2284431 A1 | 2/2011 |
| ES | 2267971 T3 | 3/2007 |
| JP | H 0882395 A | 3/1996 |
| RU | 2229649 C1 | 5/2004 |
| WO | WO 01/36850 A1 | 5/2001 |
| WO | WO 2011/039623 A2 | 4/2011 |

OTHER PUBLICATIONS

Canadian Office action issued in corresponding CA Application No. 2967274, dated Mar. 8, 2018, 4 pages.

Canadian Office action issued in Application No. 2,967,274, dated Dec. 28, 2018, 5 pages.

Canadian Office action issued in Application No. 2,987,174, dated Nov. 23, 2018, 5 pages.

Office action issued in U.S. Appl. No. 15/823,412, dated Oct. 17, 2018, 13 pages.

* cited by examiner

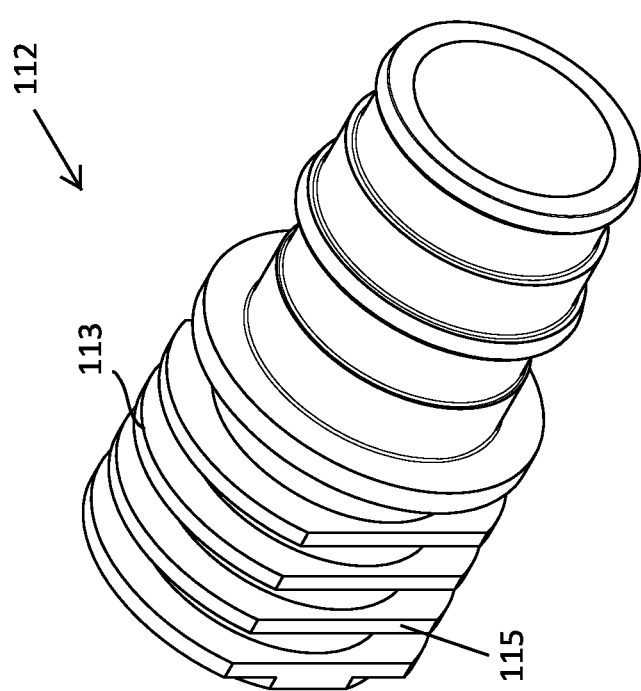

BALL VALVE WITH INTEGRATED FITTING

CROSS REFERENCE TO RELATED APPLICATIONS

The present invention claims the benefit of U.S. Provisional Application Ser. No. 62/336,484, filed May 13, 2016, the contents of which are hereby incorporated by reference in their entirety.

FIELD OF INVENTION

The present invention relates to a ball valve with an integrated fitting.

BACKGROUND

Existing ball valves typically make extensive use of metal in the valve body, which may be expensive. Existing ball valves additionally use fittings that are removably attached to the ends of the valve body, for example by a threaded engagement. The threaded engagement requires extra material in the valve body to accommodate the threads, raising the material costs. The threads also may create a potential source of wear and leakage.

SUMMARY OF THE INVENTION

Accordingly, there is a need for a ball valve which reduces costs, wear, and leakage.

The present disclosure provides a ball valve having a valve body that may be fabricated out of polypropylene random copolymer, crosslinked polyethylene, and the like. The valve body may be fabricated using an overmolding process over a cartridge which houses the ball, stem, and valve seats. The cartridge material and molding material may fuse during manufacture and create a single-piece valve body.

In some embodiments, the ball valve includes a cartridge having at least two pieces, a rotatable ball located inside the cartridge, a fitting of a material different from the cartridge, and a body overmolded to encapsulate at least a portion of the cartridge and the fitting. The body holds the fitting in a position against the cartridge to maintain the at least two pieces of the cartridge together in a closed position. In some embodiments, the body holds the fitting in a position against the cartridge to maintain a seal between the seats and the ball.

In some embodiments, a fitting may be integrated into the valve body during the manufacture of the valve body. Once fabricated, the fitting is not removable from the valve body without damaging the valve body and/or fitting. In some embodiments, the fitting and cartridge are overmolded to create the valve body. The mold may apply a pressure (e.g., by a compressive force) onto the fitting during the molding process. The fitting may transfer or urge the pressure of the mold (e.g., the compression of the mold) onto the cartridge. The fitting may transfer a sufficient amount of force to create a desired seal against the valve seats.

In some embodiments, the fitting may have a plurality of retention elements to prevent the fitting from rotating and/or translating relative to the valve body after manufacture. In some embodiments, the plurality of retention elements may include a plurality of spaced apart ribs. The ribs may have flat surfaces and/or corners on at least one side, or otherwise lack axial symmetry, to prevent the fitting from rotating relative to the valve body.

BRIEF DESCRIPTION OF THE DRAWINGS

FIG. 8 illustrates an isometric view of a fitting according to some embodiments of the invention.

DETAILED DESCRIPTION

Figure 1:
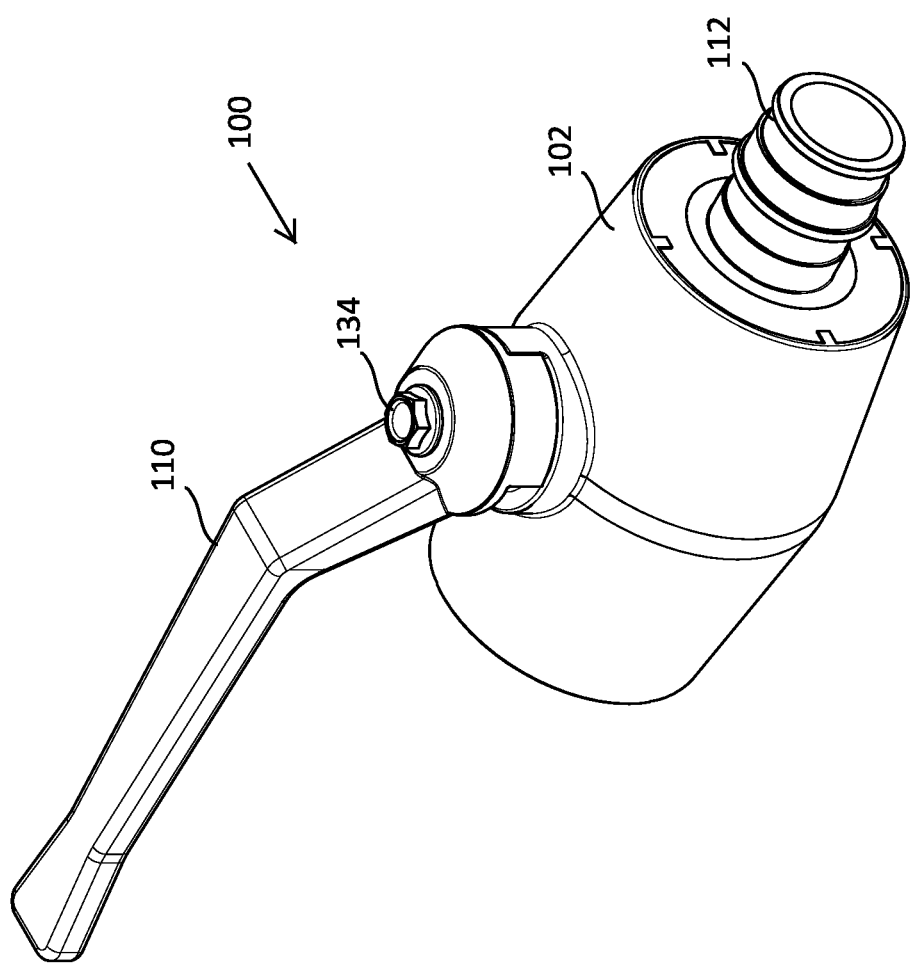
FIG. 1 illustrates a front isometric view of a ball valve according to some embodiments of the invention.
Figure 2:
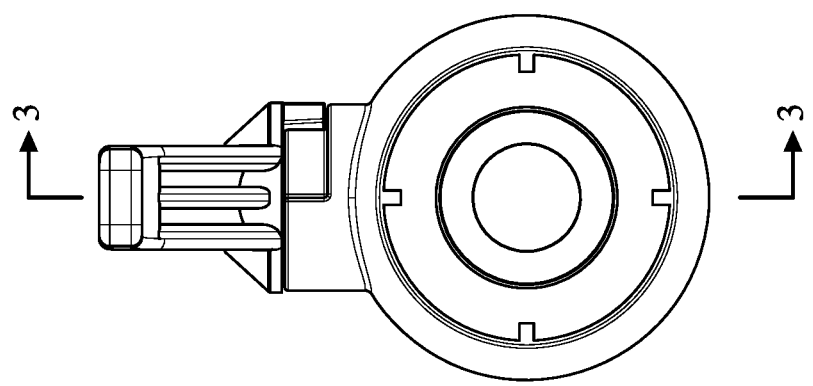
FIG. 2 illustrates a front view of the ball valve of FIG. 1.

FIGS. 1-4 illustrate a ball valve 100 according to some embodiments of the present disclosure. The ball valve 100 of FIGS. 1-4 includes a valve body 102, a ball 104, valve seats 106, a stem 108, a handle 110, and a fitting 112. As described more fully below, the ball 104 provides a mechanism for providing on and off control of fluid flow (e.g., liquid or gaseous flow) through the valve 100. The valve seats 106 provide a seal for the ball 104, and the stem 108 and handle 110 may be used to actuate the on and off control of the ball 104. The filling 112 may be integrated with the valve body 102 during manufacturing of the valve body 102, for example, by a molding process. The fitting 112 may be integral with the valve body 102 such that the fitting 112 is not removable from the valve body 102 and may fixed relative to the valve body 102.

Figure 3:
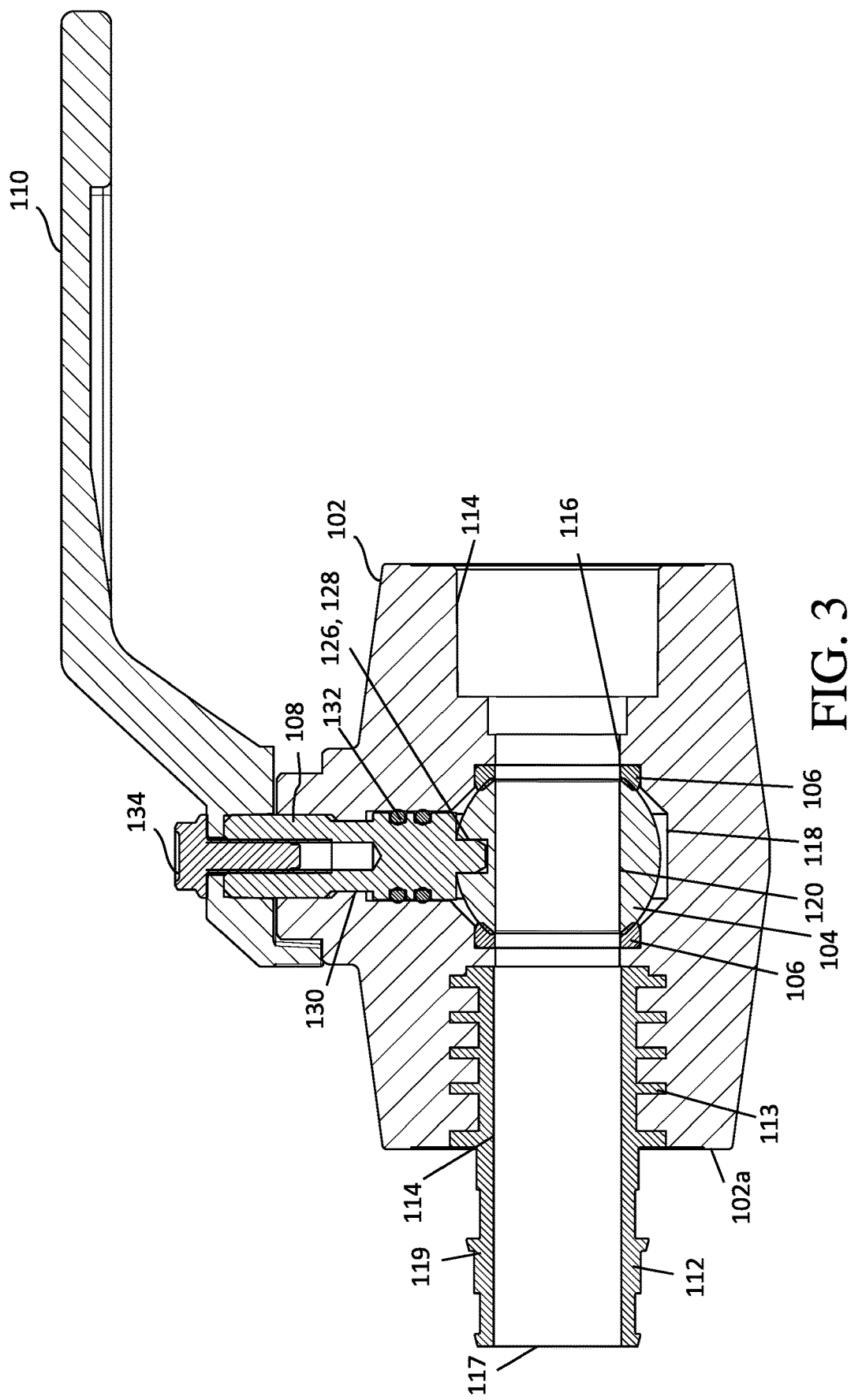
FIG. 3 illustrates a cross-sectional view of FIG. 2, the cross-section taken along the line 3-3, according to some embodiments of the invention.
Figure 4:
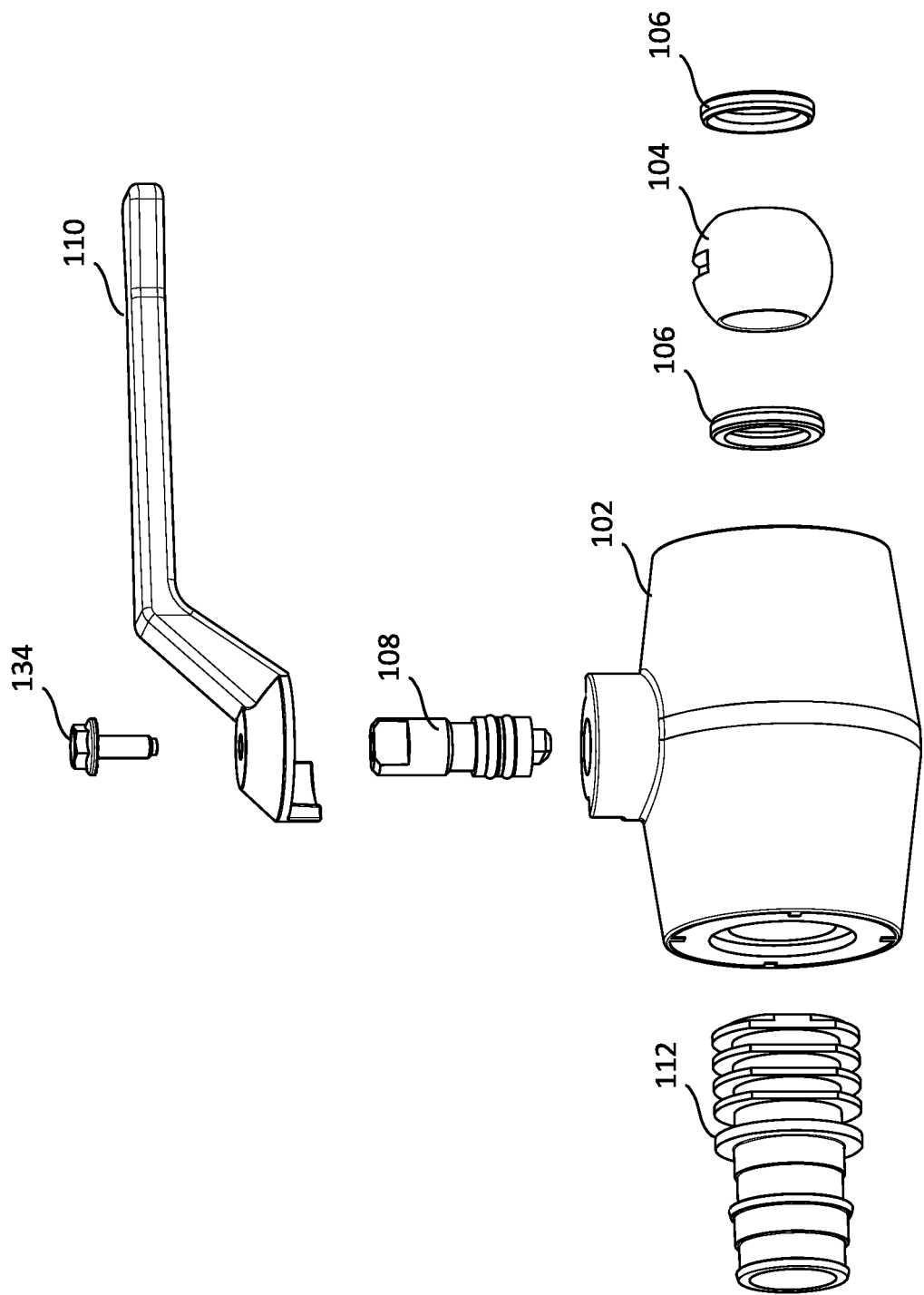
FIG. 4 illustrates an exploded view of the ball valve of FIG. 1.

The valve body 102 includes two ports 114 (i.e., on left and right sides of the valve body 102 as shown in FIG. 3) for connecting to pipes, hoses, and/or tubing (e.g., via fittings) and a longitudinal channel 116 connecting the ports. The longitudinal channel 116 may have a longitudinal axis. The valve body 102 includes a chamber 118 housing the ball 104 and valve seats 106, which are located coaxially with the channel 116. As will be described more fully below, the valve body 102 may be fabricated as a single-piece or unitary construction. The valve body 102 may be fabricated out of polypropylene random copolymer (PP-R), polypropylene random copolymer crystalline temperature (PP-RCT), crosslinked polyethylene, and the like.

Figure 5:
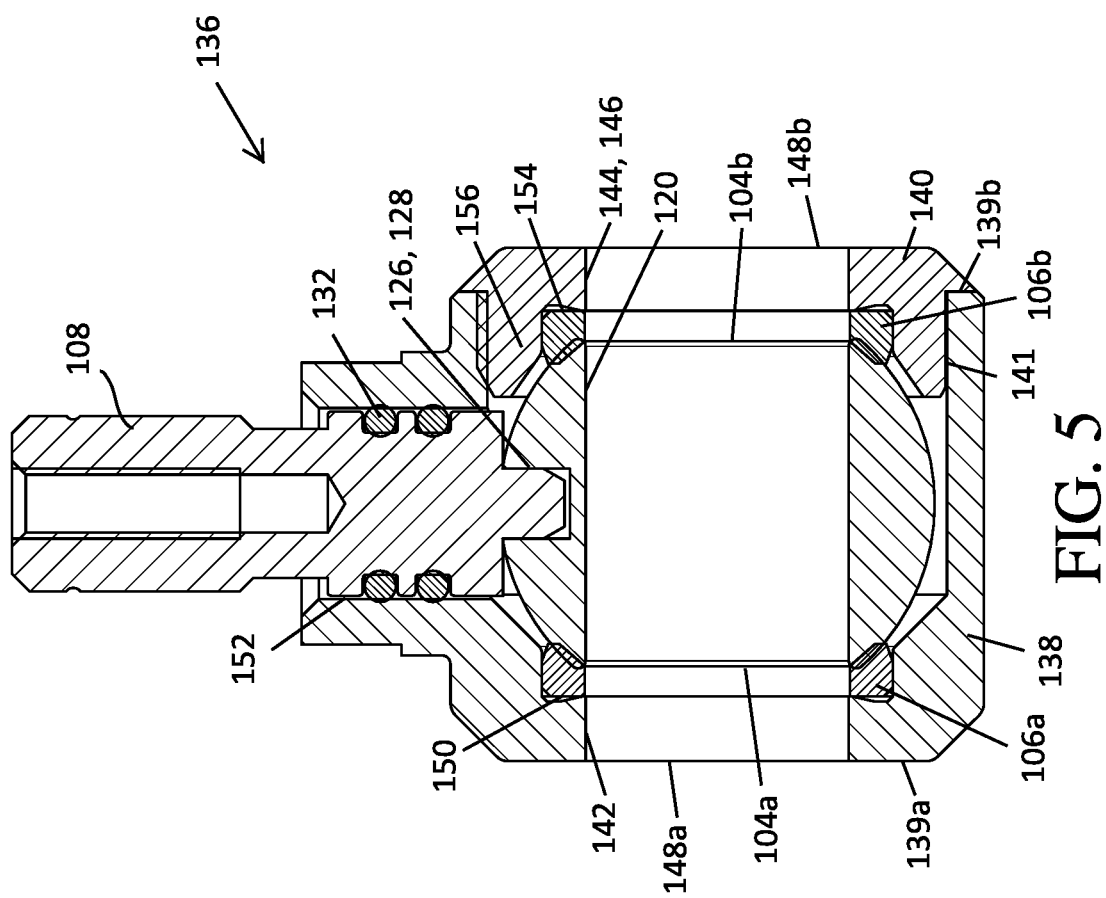
FIG. 5 illustrates a cross-sectional view of a cartridge for use in creating a valve body according to some embodiments of the invention.

The ball 104 is a substantially spherical member with a bore 120 extending through the ball 104 from a first end 104a to a second end 104b, as shown in FIG. 5. The ball 104 provides on and off control of fluid flow between the ports 114 of the valve body 102. When the bore 120 of the ball 104 is aligned with the channel 116 of the valve body 102, the valve 100 is in an open position where the ports 114 of the valve body 102 are in fluid communication. In the open position, fluid is able to flow between the ports 114 of the valve body 102. When bore 120 of the ball 104 is perpendicular with the channel 116 of the valve body 102, the valve 100 is in a closed position where the ports 114 of the valve body 102 are not connected to each other. In the closed position, fluid is restricted from flowing between the ports 114 of the valve body 102. The ball 104 may be made of plastic, metal, for example brass, chrome or chromium plated steel, and the like. The ball 104 may be made of materials which provide corrosion resistance against fluid flowing in the valve body 102 and which provide resistance against wear.

The ball 104 may be connected to the stem 108, which may be in turn connected to the handle 110. The handle 110 may be located in an upper portion of the ball valve 100 relative to the location of the ball 104 (e.g., above the ball when the ball valve is installed in a piping system). It should be appreciated that the location of the handle 110 may vary, and may, for example, be located below the ball 104 or on a side of the ball 104. The handle 110 may be rotated or pivoted (e.g., manually or automatically rotated) to actuate the ball 104 to place the valve 100 in the open or closed position. The handle 110 may be aligned with the bore 120 of the ball 104 such that the handle 110 is parallel with the channel 116 of the valve body 102 when the valve 100 is in the open position and the handle 110 is perpendicular with the channel 116 of the valve body 102 when the valve 100 is in the closed position. The handle 110 may be rotated or pivoted 90 degrees to place the valve 100 into the open position from the closed position, and vice versa. The handle 110 may be made of nylon or any other suitable material.

The ball 104 may include an engagement element 126 to connect to the stem 108, as shown in FIGS. 3 and 5. The stem 108 may include a corresponding engagement element 128 to connect to the ball 104. In some embodiments, the engagement element 126 of the ball 104 may be a slot or key and the engagement element of the stem 108 may be a post or flange configured to engage the slot of the ball 104. In some embodiments, the engagement element 126 of the ball 104 may be a post or flange and the engagement element of the stem 108 may be a slot or key configured to receive the post of the ball 104.

The stem 108 may be partially located in a passage 130 in the valve body 102 (see FIG. 3). The stem 108 may include one or more O-rings 132 providing a seal for the stem 108. The stem 108 may be connected to the handle 110 via a fastener 134. The stem 108 may be made of metal, for example brass. The O-rings 132 may be fabricated out of a polymer, for example nitrile rubber (Buna-N), ethylene-propylene, silicone, and the like.

Figure 6:
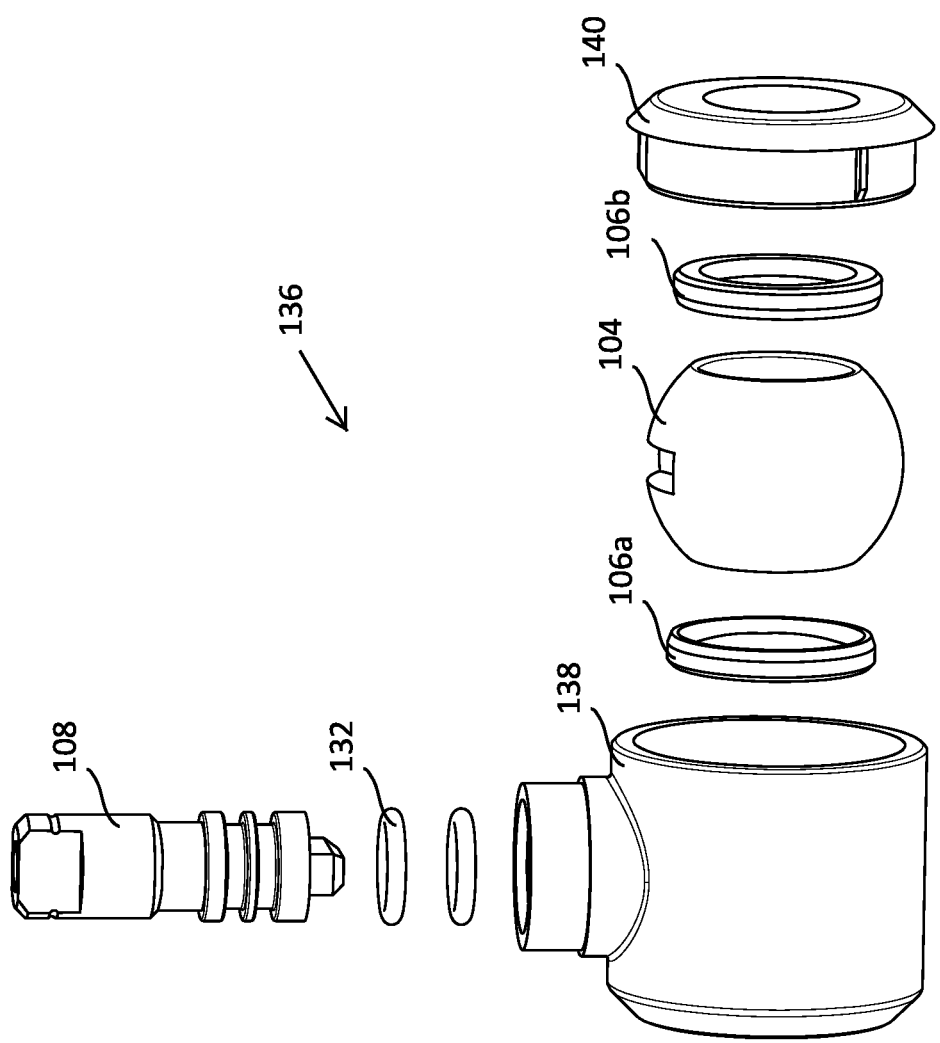
FIG. 6 illustrates an exploded view of the cartridge of FIG. 5.

In some embodiments, the valve body 102 may be fabricated as a single-piece or unitary construction (e.g., a monolithic part). FIGS. 5-6 illustrate a cartridge 136 which may be used to fabricate the valve body 102 in some embodiments. The cartridge 136 may include a cartridge body 138, a cartridge cap 140, the ball 104, valve seats 106a, 106b, and the stem 108.

The cartridge body 138 may be substantially hollow and may include a first end 139a and a second end 139b. The second end 139b of the cartridge body 138 may be sized to receive the cartridge cap 140 as described below. Additionally, the cartridge body 138 and the cartridge cap 140 each contain a through-hole 142, 144 located at outer ends of the assembled cartridge 136. The through-holes 142, 144 form part of a channel 146 in the cartridge that extends from a first end 148a of the cartridge 136 to a second end 148b of the cartridge 136 when the bore 120 of the ball 104 is properly aligned. The cartridge body 138 may include a bore 152 connecting an interior of the cartridge body 138 to outside of the cartridge body 138. In some embodiments, the bore 152 connects an interior of the cartridge body 138 to an outside area located above the cartridge body 138 relative to the position of the ball 104.

The cartridge 136 may be assembled as follows. A first seat 106a may be placed inside of the cartridge body 138. The first seat 106a may be inserted from a position adjacent the second end 139b of the cartridge body 138 and moved towards the first end 139a of the cartridge body 138. The first seat 106a may be received in a groove 150 in the cartridge body 138. The groove 150 may have a shape that corresponds to an outer contour of the first seat 106a. In some embodiments, the groove 150 may have a substantially circular shape. Following insertion of the first seat 106a, the ball 104 may be placed inside of the cartridge body 138 adjacent the first seat 106a (e.g., touching the first seat 106a). It should be understood that when two elements are adjacent one another as used herein, the elements are considered to be "near" or "close to" each other, and may or may not be in direct contact. Next, the stem 108 may be placed inside of the bore 152 in the cartridge body 138. The engagement element 126 of the ball 104 may then be connected to the engagement element 128 of the stem 108. A second seat 106b may be received in a groove 154 of the cartridge cap 140 and the cartridge cap 140 may be received in the second end 139b of the cartridge body 138 (e.g., in an opening of the cartridge body 138). In some embodiments, an annular flange 156 of the cartridge cap 140 may be received in the second end 139b of the cartridge body 138. The second end 139b of the cartridge body 138 may have an opening 141 that is sized to mate with the flange 156 of the cartridge cap 140. The seats 106a, 106b may be made of a polymer, such as polytetrafluroethylene (PTFE).

In some embodiments, the cartridge cap 140 and the cartridge body 138 may be held together by a friction fit. In some embodiments, a set pressure (e.g., by a compressive force) may be required to seat or seal the cartridge body 138 to the cartridge cap 140 (e.g., to seat or seal the valve seats 106a, 106b), as described below.

In some embodiments, the valve body 102 may be fabricated using the assembled cartridge 136. The assembled cartridge 136 may be placed in a mold template having the outer shape of the valve body 102 and the assembled cartridge 136 may be overmolded to form the valve body 102 (e.g., by injection molding). The cartridge body 138, cartridge cap 140, and molding material may have the same material such that the cartridge body 138 and cartridge cap 140 fuse with the molding material during the mold process and create a single-piece valve body 102. As shown in FIG. 3, the cartridge 136 may fuse into the valve body 102 such that no visible seam is between the cartridge 136 and the valve body 102. In some embodiments, the cartridge body 138, cartridge cap 140, and molding material are made of polypropylene random copolymer, polypropylene random copolymer crystalline temperature, crosslinked polyethylene, or the like. In some embodiments, when the mold closes in order to inject the molding material and create the valve, the mold transfers a fixed amount of compressive force (e.g., a linear compressive force) to seat the valve seats 106a, 106b. The mold may include mandrels that apply compressive forces to both ends of the cartridge body 138 surrounding the valve seats 106. The mandrels may also serve to form the longitudinal channel 116 and/or ports 114 of the valve body 102, for example, by being placed inside of the mold template to prevent molding material from filling in the channel 116 and/or ports 114. It should be appreciated that additional pins or other elements may be placed inside of the mold template to prevent molding material from filling in the channel 116 and/or ports 114.

Figure 7:
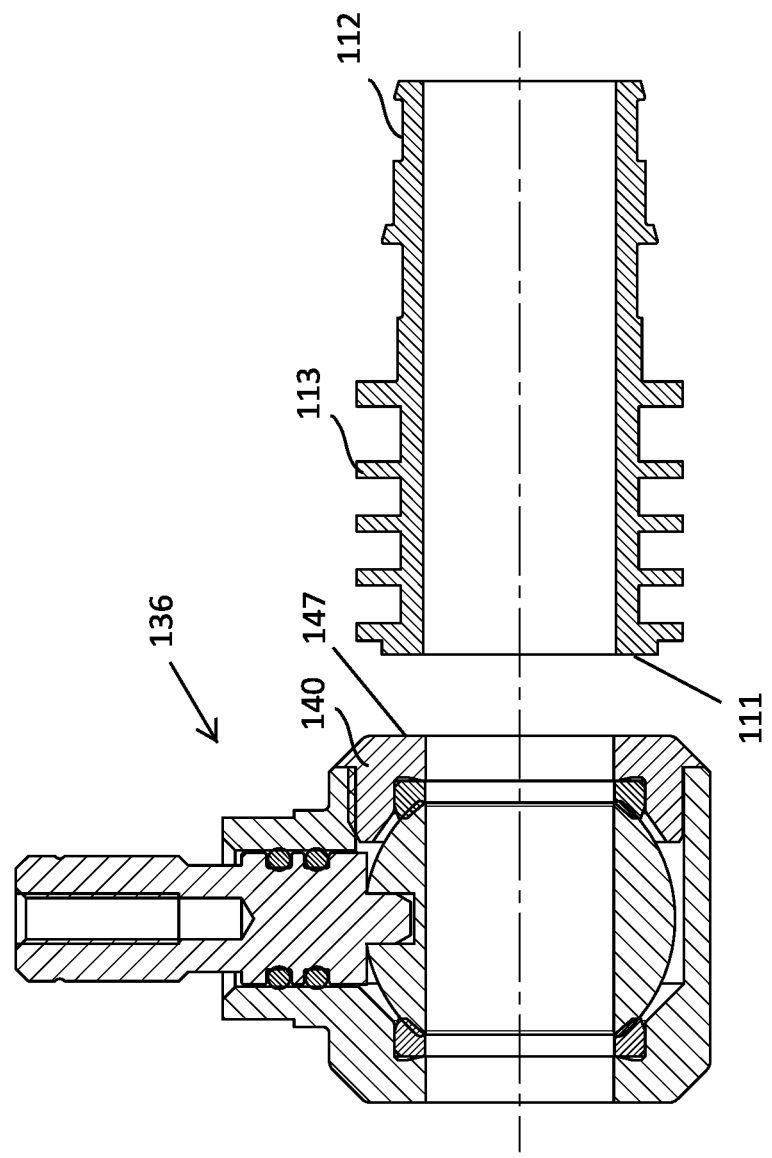
FIG. 7 illustrates an orientation of a cartridge and fitting for creating a valve body according to some embodiments of the invention.

FIGS. 3 and 7 illustrate the fitting 112 which may be integrated into the valve body 102 during the manufacture of the valve body 102 (e.g., during a molding process used to create the valve body 102). The fitting 112 may be integral with the valve body 102 during manufacture of the valve body 102 such that the fitting 112 is not removable from the valve body 102 after manufacture without damaging the valve body 102 and/or fitting 112.

As shown in FIG. 3, the fitting 112 has a substantially hollow cross-section which may be aligned (e.g., coaxially aligned) with the longitudinal channel 116 of the valve body 102. In some embodiments, only a portion of the fitting 112 is aligned with the longitudinal channel 116 of the valve body 102. Portions of the fitting 112 may have bends or curves, for example, portions of the fitting 112 located outside of the valve body 102. The fitting 112 may be located adjacent and spaced apart from one of the valve seats 106.

The fitting may have a plurality of retention elements 113 which may be connected to the material of the valve body 102. The plurality of retention elements 113 may prevent the fitting from being removed from the valve body 102 after manufacture. The plurality of retention elements 113 may prevent translation of the fitting 112 relative to the valve body 102 and/or may prevent rotation of the fitting 112 relative to the valve body 102. In some embodiments, the plurality of retention elements 113 may include a plurality of ribs. The ribs may be axially spaced apart along a length direction of the fitting 112 (e.g., in a direction along the longitudinal channel 116), and the ribs may extend circumferentially around a portion of the fitting 112 or around the entire fitting 112. One or more of the retention elements 113 may be symmetric around the fitting 112, or may be non-axisymmetric. In embodiments where the retention elements 113 include ribs, one or more of the ribs may have flat surfaces 115 and/or corners or edges on at least one side to prevent the fitting 112 from rotating relative to the valve body 102 (see, e.g., FIG. 8). One or more of the retention elements 113 may include flat surfaces and/or corners, edges, or the like, on a different location of the retention element 113 relative to other retention elements 113 (for example, one retention element may have a flat on an upper portion of the retention element closer to the handle and another retention element may have a flat on a lower portion of the retention element further from the handle). In some embodiments, a single retention element 113 may include flat surfaces and/or corners, edges, or the like on multiple locations on the retention element 113. A rib adjacent an end 102a of the valve body 102 may have a circular shape, and may serve as an external flange for the valve (see, e.g., FIG. 3). In some embodiments, the retention elements 113 may include slots, depressions, and/or grooves in an outer surface of the fitting 112 (e.g., that are recessed relative to the outer surface of the fitting 112). After manufacture of the valve, the slots, depressions, and/or grooves may form an interlocking connection with the valve body 102 that prevents translation and/or rotation of the fitting 112 relative to the valve body 102. Different types of retention elements 113 may be used in combination, such as ribs and grooves. In addition, various retention elements 113 may have different sizes and/or shapes from each other. For example various retention elements 113 may include ribs having different sizes and/or shapes. For example, various retention elements 113 may include slots having different sizes and/or shapes. For example, various retention elements 113 may include a combination of projections (such as ribs) and/or slots, depressions, and/or grooves having different sizes and/or shapes. Further, it should be appreciated that the retention elements 113 may be oriented at different angles relative to each other and/or relative to the outer surface of the fitting 112, and/or relative to the direction along the longitudinal channel 116. For example, one or more retention elements 113 may be oriented at an angle of 45 degrees relative to the longitudinal channel 116.

The fitting 112 may be made of metal, such as brass. The fitting 112 may have an end 117 that extends outside of the valve body 102 and may have a connector 119 to couple to a pipe, hose, and/or tubing. In some embodiments, the connector 119 may be configured to mate to cross-linked polyethylene (PEX) tubing.

While a single fitting 112 is depicted in FIG. 3, it should be appreciated that a one or more fittings 112 may be used, for example, first and second fittings 112. The second fitting 112 may be located, for example, in the area of port 114 (i.e., on the right side of the valve body 102 as shown in FIG. 3) and may be adjacent and spaced apart from the valve seat 106. The second fitting 112 may be made of the same material or materials as the first fitting 112 or may be made of different materials. The second fitting 112 may include retention elements 113, and may include retention elements 113 that are the same or different than those of the first fitting 112.

FIG. 7 illustrates an orientation of the assembled cartridge 136 and fitting 112 during manufacture of the valve body 102 according to some embodiments. In FIG. 7, the assembled cartridge 136 and the fitting 112 are depicted as being spaced apart for clarity. It should be appreciated that the assembled cartridge 136 and the fitting 112 may be directly adjacent (e.g., in direct contact) during manufacture. The fitting 112 may be placed adjacent the cartridge cap 140 of the cartridge 136 during manufacture (e.g., where the fitting 112 is in direct contact with the cartridge cap 140). In some embodiments, an end 111 of the fitting may be in direct contact with an end 147 of the cartridge cap 140 during manufacture. In some embodiments, more than one surface of the fitting 112 may be in contact with the cartridge cap 140 during manufacture. As described above, prior to manufacture of the completed valve body 102, the valve seats 106a, 106b may not be seated against the ball 104. The fitting 112 and assembled cartridge 136 may be placed in a mold template having the outer shape of the valve body 102. The assembled cartridge 136 and fitting 112 may be overmolded to form the valve body 102 (e.g., by injection molding). The cartridge body 138, cartridge cap 140, and molding material may have the same material such that the cartridge body 138 and cartridge cap 140 fuse with the molding material during the mold process and create a single-piece valve body 102. In some embodiments, the cartridge body 138, cartridge cap 140, and molding material are made of polypropylene random copolymer, polypropylene random copolymer crystalline temperature, crosslinked polyethylene, or the like. In some embodiments, the mold applies a pressure (e.g., by a compressive force) onto the fitting 112 during the molding process. The mold may apply a fixed amount of linear compressive force onto the fitting 112. The fitting 112 may transfer the pressure of the mold onto the cartridge 136, and, in particular, may transfer the compressive force of the mold onto the cartridge cap 140 (e.g., by directly contacting the end 147 of the cartridge cap 140 with the end 111 of the fitting 112). The fitting 112 may transfer a sufficient amount of force to seat the valve seats 106a, 106b. The mold may also include a mandrel applying a pressure to the cartridge 136 on a side of the cartridge 136 opposite the fitting 112 (e.g., by directly contacting the cartridge body 138). The mandrel may act to hold the cartridge 136 in place and to help seat the valve seats 106a, 106b.

While the present invention has been described in connection with certain exemplary embodiments, it is to be understood that the invention is not limited to the disclosed embodiments, but is instead intended to cover various modifications and equivalent arrangements included within the spirit and scope of the appended claims, and equivalents thereof.

What is claimed is:

1. A ball valve comprising:
a valve body having two ends and a channel extending between the two ends;
a ball located inside of the valve body, the ball having a bore extending through the ball from a first end of the ball to a second end of the ball;
two valve seats, wherein a first seat is adjacent the first end of the ball and a second seat is adjacent the second end of the ball; and
a fitting made of a material different than the valve body integrated into the valve body, the fitting located adjacent and spaced apart from one of the valve seats and extending in a direction along the channel of the valve body, the fitting having a plurality of ribs that are spaced apart in the direction along the channel,
wherein the plurality of ribs are configured to prevent translation and rotation of the fitting relative to the valve body, and
wherein at least one of the ribs of the fitting is non-axisymmetric relative to an axis extending in the direction along the channel.

2. The ball valve of claim 1, wherein the fitting is made of brass and the valve body is made of polypropylene random copolymer.

3. The ball valve of claim 1, wherein the body comprises a port at an end of the valve body opposite to the fitting, wherein the fitting comprises an inner wall defining a passage, and wherein the ball is rotatable from a first position wherein the port is in fluid communication with the passage of the fitting, to a second position wherein the ball prevents fluid communication between the port and the passage of the fitting.

4. The ball valve of claim 1, further comprising a second fitting, the second fitting located adjacent one of the valve seats and extending in a direction along the channel of the valve body, the second fitting having a plurality of ribs that are spaced apart in the direction along the channel.

5. The ball valve of claim 1, wherein at least two of the plurality of ribs of the fitting are non-axisymmetric relative to an axis extending in the direction along the channel.

6. The ball valve of claim 1 wherein:
the valve body comprises:
a cartridge having at least two pieces surrounding the ball and the valve seats; and
a body overmolded to encapsulate at least a portion of the cartridge and the fitting, the body urging the fitting against the cartridge such that the fitting transfers sufficient compressive force onto the cartridge to maintain the two pieces of the cartridge together in a closed position and seat the valve seats against the ball.

7. A ball valve comprising:
a valve body having two ends and a channel extending between the two ends;
a ball located inside of the valve body, the ball having a bore extending through the ball from a first end of the ball to a second end of the ball;
two valve seats, wherein a first seat is adjacent the first end of the ball and a second seat is adjacent the second end of the ball; and
a fitting made of a material different than the valve body integrated into the valve body, the fitting located adjacent and spaced apart from one of the valve seats and extending in a direction along the channel of the valve body, the fitting having a plurality of ribs that are spaced apart in the direction along the channel,
wherein the plurality of ribs are configured to prevent translation and rotation of the fitting relative to the valve body, and
wherein at least one of the ribs comprises a flat surface on at least a portion of an outer edge of the rib, the flat surface having a width extending substantially in the direction along the channel, the flat surface configured to hinder rotation of the fitting relative to the valve body.

8. The ball valve of claim 7, wherein the at least one of the ribs further comprises a curved surface on another portion of the outer edge of the rib having a width extending substantially in the direction along the channel.

9. The ball valve of claim 7, wherein at least two of the plurality of ribs of the fitting each comprise a flat surface portion and a curved surface portion on an outer edge of the respective ribs, the flat surface portions having widths extending substantially in the direction along the channel, the flat surface portions configured to prevent rotation of the fitting relative to the valve body.

10. The ball valve of claim 7, further comprising a second fitting, the second fitting located adjacent one of the valve seats and extending in a direction along the channel of the valve body, the second fitting having a plurality of ribs that are spaced apart in the direction along the channel.

11. The ball valve of claim 7 wherein:
the valve body comprises:
a cartridge having at least two pieces surrounding the ball and the valve seats; and
a body overmolded to encapsulate at least a portion of the cartridge and the fitting, the body urging the fitting against the cartridge such that the fitting transfers sufficient compressive force onto the cartridge to maintain the two pieces of the cartridge together in a closed position and seat the valve seats against the ball.

* * * * *